Sept. 13, 1927.
J. McMULLEN
1,641,983
CAR BRAKE DEVICE
Filed Jan. 20, 1927
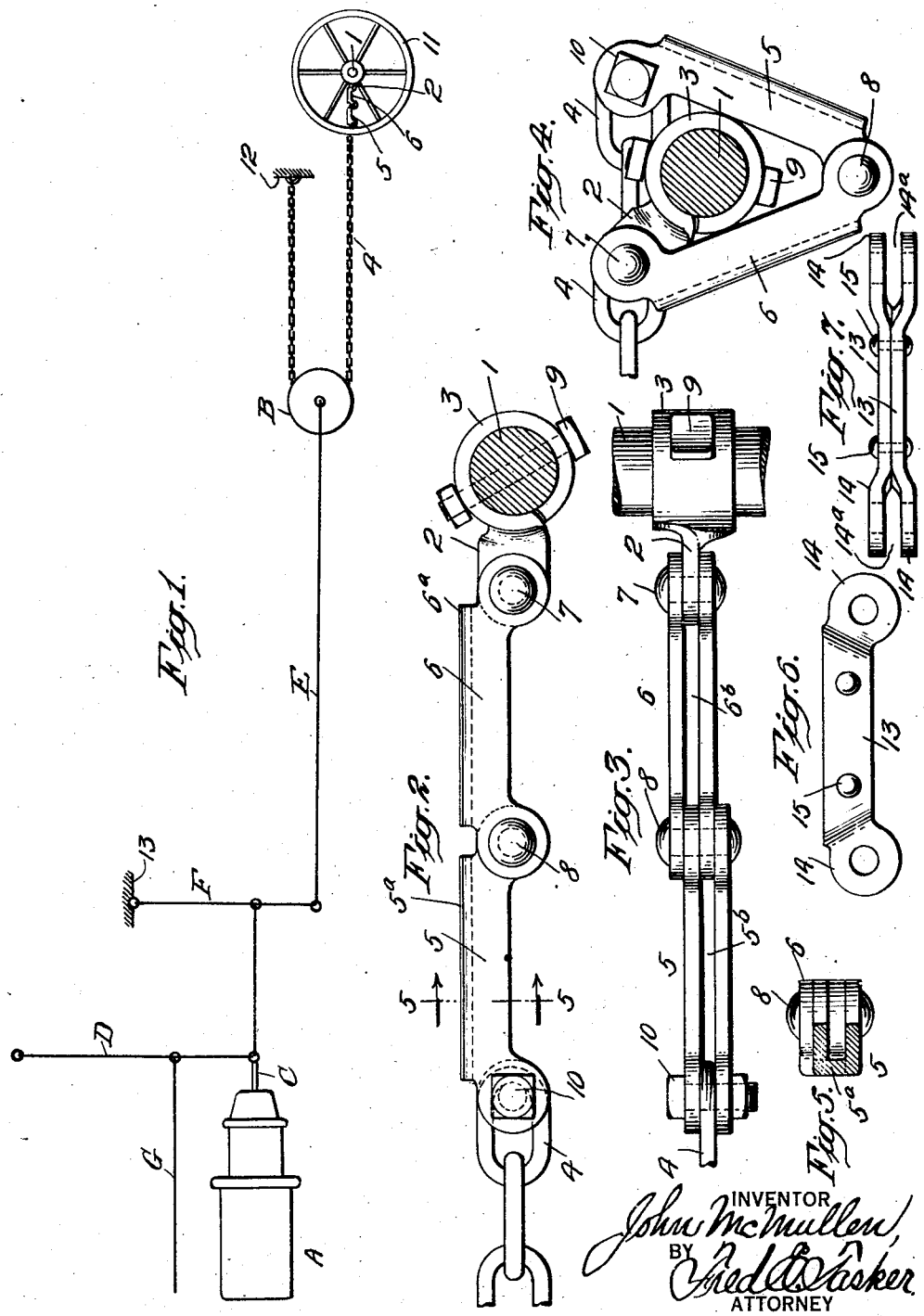

Patented Sept. 13, 1927.

1,641,983

UNITED STATES PATENT OFFICE.

JOHN McMULLEN, OF BUFFALO, NEW YORK.

CAR-BRAKE DEVICE.

Application filed January 20, 1927. Serial No. 162,247.

My present invention refers to a brake device for railway cars and other vehicles, and more particularly to mechanical means for winding up the chain which connects a manually-operated brake wheel or equivalent lever or other manual device with the leverage mechanism or connection communicating motion to the shoes, a leading object among many that might be mentioned being to provide means for effectively applying the hand brake appliances when the same are required for use in emergency or other calls; and to this end taking up the loose chain or connection, so that the brake shoes may be instantly set by hand, particularly in a case where the air fails, and so set with a power equal to a fluid pressure application. The invention therefore may be said to consist essentially in the construction, arrangement, and combination of parts, substantially as will be hereinafter described and claimed.

In the accompanying drawings illustrating my invention:

Figure 1 is a diagrammatic plan view of the essential features of a railway car brake equipment with my special improved brake applying connections arranged therewith.

Figure 2 is an enlarged detailed plan view of the link features which assist in tightly and quickly winding up the chain.

Figure 3 is an edge view of the same.

Figure 4 is a cross sectional plan view of the interpivoted link members folded together and with the brake chain partly wound up.

Figure 5 is a cross-section on the line 5, 5, of Figure 2.

Figure 6 is a plan view and Figure 7 a side or edge view of an alternate form of the invention.

Similar characters of reference designate like parts throughout all the figures of the drawing.

In Figure 1 I have shown a form of air brake mechanism in diagrammatic outline, together with a hand brake, so as to indicate how my improved car brake devices are arranged to function. In this view A denotes the brake cylinder on a car; C the brake cylinder piston rod; D the cylinder lever, from which runs the lever G for actuating the brake shoes (not indicated); F an outline of leverage connected at 13 to the car, and having an actuating rod or lever E extending to the sheave or pulley B, around which passes the brake chain 4, one end of which is firmly attached at 12 to the car body, while the other end is commonly and usually attached to the brake post 1, which post carries the hand wheel 11, but in my improved device the chain 4 is not attached directly to the post 1 but is connected to the end of a flat extended link connection or member 5, which is pivoted to another similar flat link, arm, lever, or member 6, which is in turn pivoted to a lug 2 on a sleeve or hub 3 secured to post 1 by a bolt 9, pin, or any other suitable means which passes through a hole in the post 1 and proper coinciding holes in the hub 3. Of course it will be recognized that the mechanism of the air brake and the levers therefor and for the brake shoes is portrayed only diagrammatically, and all the detail mechanism is not shown, as that would be unnecessary, as I only need to indicate the relation to such parts in a general way of the brake chain and the interpivoted links serving with the brake wheel on this post, so as to explain the novelty and value of my improved car brake device.

The brake post 1 provided with its hand wheel 11 is supported in any customary or convenient part of a car or other conveyance, as for instance the platform of a passenger coach or the top of a freight car, and may have a pawl and ratchet and other suitable details which it is unnecessary to show here. Secured to the post 1 is a sleeve or hub 3, through which the post 1 passes, the post 1 and hub 3 being securely fastened together by a bolt and nut 9, a pin or dowel passing through an opening in hub 3 and a co-incident opening in post 1. The hub 3 in its manufacture has one end of the blank strap from which it is formed turned at a right angle to provide a short flat lug 2, which is pivoted by means of a rivet form of pivot 7 to a connecting flat extended link member 6, which is pivoted to another similar flat link member 5 by a pivot 8, said member 5 being pivoted by a pivot 10 to the first ordinary loose link of the chain 4.

The two interpivoted flat link members 5 and 6, which cooperate with the chain 4, are the essential features of my invention, when combined with the chain and other chief parts of a car brake device. They may be made in a variety of different ways, but they usually consist each of two parallel flat plates or strips connected in one case by a rib 5ª and in the other case by a rib 6ª, so as to provide slots 5ᵇ and 6ᵇ respectively, each of the flat links 5 and 6 being thus made of a single integral piece of metal bent upon itself in a U-form, this form giving strength and being convenient to manufacture.

The ends of the links 5 and 6 are somewhat flared or projected on an angle with ears that are perforated to receive respectively the bolts or pivots 7, 8, and 10. See Figure 2. The first regular loose chain link of the chain 4 enters between the companion horizontal plates of link 5 in the slot 5ᵇ and is loosely held by the pivot 10. As stated the ends of the link 5 are bent more or less as shown and those nearest the link 6 interengage with similar bent ends of link 6, by entering slot 6ᵇ, all of said ends of the links being perforated to receive the proper pivot or bolt, while the other ends of the link 6 receive within the slot 6ᵇ the lug 2 which is pivoted therein by pivot bolt 7. The engagement of link 5 with link 6 is preferably as shown in Figure 3 where the lower member of link 5 is below the lower member of link 6, so as to bring the chain 4 lower down and enable it to clear the hub 3 and wind directly on the post 1 when it is being wound up.

Thus it is clear that the two important U-shaped flat elongated and slotted interpivoted link members 5 and 6 which connect the hub and post 1 with the wind-up chain 4 constitute devices that are rigid or non-flexible vertically but are foldable and flexible horizontally so as to wind up the chain by first taking up the slack by the folding up of the special link members and bring the chain devices 4 or other connection right up against the post 1 so that it may wind thereon when said post is rotated by the hand wheel 1. In this way the chain 4 will not spiral down the shaft to the stirrup at which point it would double over itself and greatly diminish the braking power, but in my improved device it will wind on the post 1, as upon a member of small diameter.

When the hand brake is called upon for use the first turn of the wheel 11 and its post 1 will move the interpivoted flat links 5 and 6 from the extended position shown in Figures 2 and 3 to the folded position in Figure 4, where the chain 4 has been brought directly up to the post 1, all the looseness being now out of the chain as shown in Figure 4 and the chain being ready to wind on the staff 1. It is obvious that the continued rotation of the wheel 11 and the staff 1 will cause the chain to wind around the staff 1, and the tightening of the chain will be done gradually and by the winding of the same upon a member of small diameter, which will increase the force with which the shoes are applied to the wheels and provide a very strong braking power.

In Figures 6 and 7 I show an alternate form of the invention, where the links 13 each consist of a pair of flat elongated plates riveted together at 15, 15, and with their ends 14 bent so as to be spaced apart to furnish an intervening slot 14ª, to assist in pivoting the two lengths together. This pair of interpivoted links, though not each made of an integral piece of metal bent in U-form, serves a similar purpose and provides a foldable member which immediately upon the turn of the hand wheel brings up the end of the chain 4 to the post 1 so that it may wind thereon.

Other changes and modifications in the details of the invention may be made without exceeding the scope of the claims.

Having thus described my invention, what I claim as new and desire to secure by Letters Patent is:

1. In a car brake device, the combination with a chain, and a rotatable post having a hand wheel thereon, of means connecting the post and the chain consisting of a pair of flat interpivoted U-shaped levers forming a member which is rigid against vertical movement but foldable in a horizontal plane to bring the end of the chain up to the post so it may wind thereon.

2. In a car brake device, the combination with a chain, and a post having means for manually revolving the same, of interpivoted U-shaped elongated link members connecting the post with the chain and adapted to be folded around the post when the latter is revolved so as to cause the chain to be applied to the post for winding thereon.

3. In a car brake device, the combination with a chain and a rotary member on the car, of means connecting said member with the chain, comprising interpivoted extended flat link members, whose ends interengage in slots formed in such ends, in order that a foldable device may be provided to bring the end of the chain quickly to the rotary member when the latter is revolved, and thus prevent the chain from spiralling down the shaft or rotary member to a point where it would double over itself and decrease braking power.

4. In a car brake device, the combination with a chain of interpivoted U-shaped links having longitudinal slots therein and adapted to be connected to the chain, a post, a hub thereon having a lug, means for movably connecting the aforesaid links to said lug, together with means for rotating the hub and folding up the aforesaid links.

5. In a car brake device, the combination with a chain for transmitting motion to the brake shoes, a rotary post and means for rotating it, of means for quickly bringing the end of the chain up to the post consisting of a pair of interpivoted links connected to the chain and pivoted to a hub on the post, said links consisting each of a pair of flat plates integral with each other and having a rib connection and a longitudinal slot, all substantially as described.

6. In a car brake device, the combination with a chain for transmitting motion to the shoes, of means for winding up the chain consisting of a rotary post and a hub on said post, together with a member connecting the chain and the hub and consisting of duplicate interpivoted U-shaped flat links which operate as such member so as to be foldable in a horizontal plane but non-flexible in a vertical plane in order that the end of the chain may be quickly brought up to the post to be wound thereon, and be prevented from spiralling down the shaft to a point where it would double over itself and decrease braking power.

In testimony whereof I hereunto affix my signature.

JOHN McMULLEN.